Patented Apr. 17, 1928.

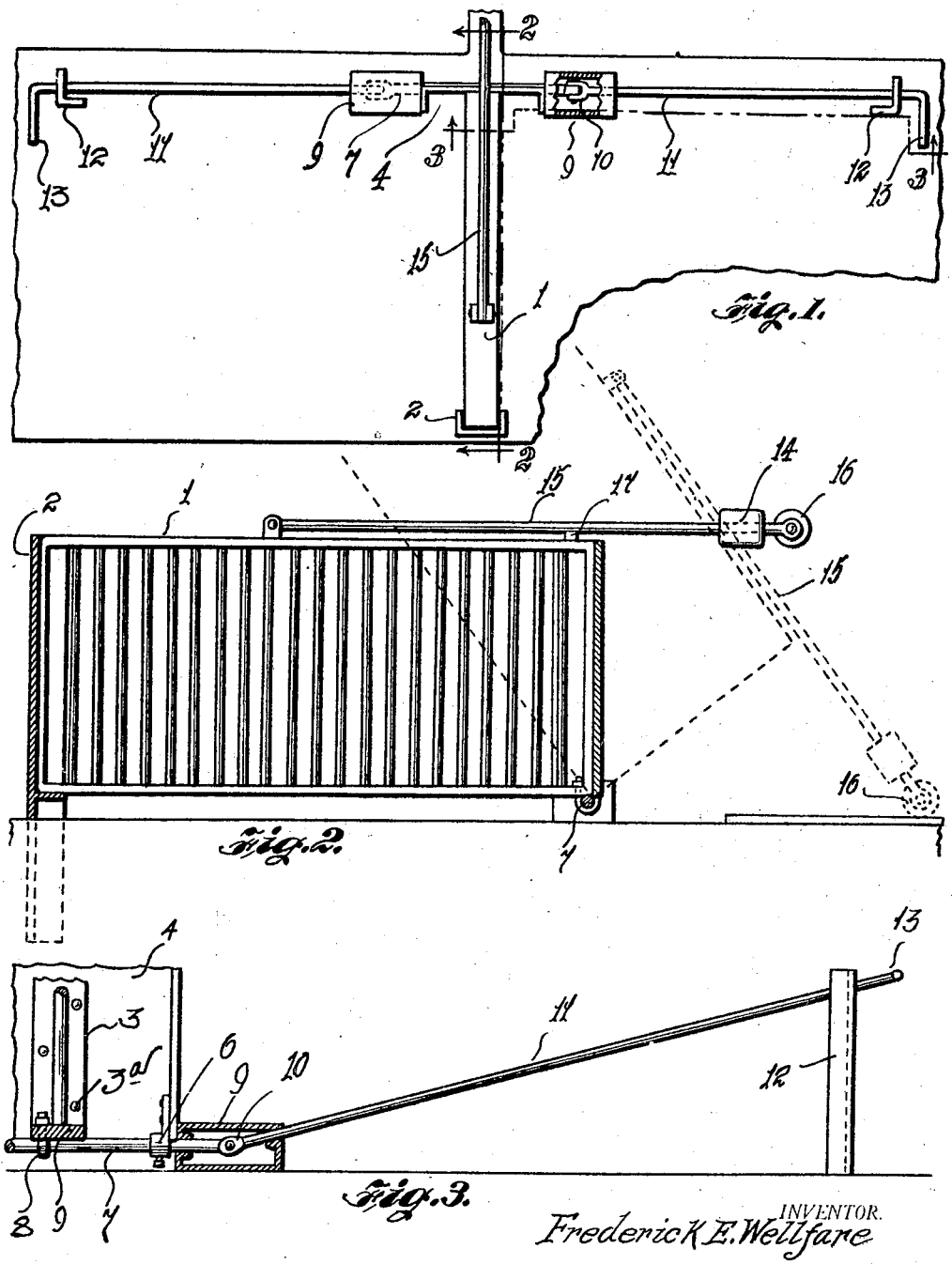

1,666,113

UNITED STATES PATENT OFFICE.

FREDERICK E. WELLFARE, OF DALLAS, TEXAS.

MECHANISM FOR OPENING AND CLOSING GATES, WINDOWS, AND SIMILAR STRUCTURES.

Application filed August 21, 1926. Serial No. 130,581.

This invention relates to new and useful improvements in mechanisms for opening and closing gates, windows and doors and more generally the invention refers to a simple mechanism or mechanical movement applicable to any object requiring a shifting of its position from one point to another.

The invention will be better understood from a perusal of the following detailed description taken in connection with the drawings accompanying the same and wherein:

Figure 1 is a top or plan view of a gate and illustrating an embodiment of the invention as applied thereto.

Figure 2 is a longitudinal sectional view of Figure 1, taken on line 2—2 thereof.

Figure 3 is a detail sectional view taken along line 3—3 of Figure 1.

Proceeding in accordance with the drawings, wherein similar numerals indicate the various parts, in Figure 1 the mechanism is shown applied to a gate across a highway or road. A gate is shown at 1. In normal closed position the gate is seated at one end in the channel of a post 2 which may be imbedded in concrete if preferred.

The opposite end of the gate 3 is attached by bolts 3ª to a panel 4, the panel providing an element for permitting the gate to be swung to open or closed position. In Figure 3 it will be seen that this panel 4 is angular shape and one side is rigidly secured by a bearing 6 to a rod 7. This rod is also rigidly attached to the bar 7 of the gate by a clamping member 8. The opposite side or flange of the panel is provided with another bearing 6 (not shown) for fastening the rod 7 thereto.

Each end of the rod 7 projects beyond the sides of the panel 4 into a housing 9 and is here connected by a knuckle 10 to an operating bar 11, one on each side of the gate. The bars 11 project at an angle from the knuckle 10 and are normally supported at their free ends upon an angular post 12 provided with a notch (not shown) for holding the bars 11 in normal inoperative position. Each end of the bar 11 has a handle 13.

To provide for easy movement of the gate there is a balancing weight 14 connected to a rod 15 on the outer end of which is a roller 16. The inner end of this rod 15 is secured to the top bar of the gate and rigidly fastened thereto at 17.

In operating the gate to open and closed position, the operator takes hold of the handle 13 and twists the bar sideways. This will tilt the gate upwardly and when the gate has been lifted or swung so that its weight is slightly past the point of gravity of the rod 7, the weight 14 will by gravity assist in completing the opening, the gate when fully open occupying the position shown by dotted lines in Figure 2. In this position the gate is supported by the rod 7 and rollers 16.

A reverse movement of the opposite bar 11 will close the gate.

It should be understood, however, that the invention is not limited to this particular arrangement, but may be employed in opening and closing doors, also gates at railroad crossings, by means of a shaft placed at right angles of the object, the shaft to be operated from any vehicle or from the ground by rods fastened to the shaft that tilts or throws the aforesaid objects from one position to another. The inventor reserves the right and privilege of using flexible knuckles, cords, chains with weights, universal joints or gearings or counter balances to assist in the operation of the movement of the object. The invention also includes the method of securely fastening the object to be moved against pressure from any cause from either side thereof.

What is claimed is:

1. A device of the character described comprising a vertically swinging gate adapted to be swung from horizontal to oblique position about a pivot located at one corner thereof, and a rod carried at the top of said gate and extending outwardly therefrom, the outer end of said rod serving as one support for said gate when in raised position.

2. A device of the character described comprising a vertically swinging gate adapted to be swung from horizontal to oblique position about a pivot located at one corner thereof, and a rod carried at the top of said gate and extending outwardly therefrom, the outer end of said rod serving as one support for said gate when in raised position, and a balancing weight carried by said rod.

3. A device as set forth in claim 1 in which a roller is carried at the end of said rod.

4. A device of the character described comprising a vertically swinging gate adapted to be swung from horizontal to oblique position about a pivot located at one corner thereof, and a rod carried at the top of said gate and extending outwardly therefrom, the outer end of said rod serving as one support for said gate when in raised position, and a hollow post adapted to receive the end of the gate opposite said pivot when the gate is in lowered position.

In testimony whereof I affix my signature.

FREDERICK E. WELLFARE.